United States Patent [19]
Iijima

[11] 3,877,320
[45] Apr. 15, 1975

[54] PLANETARY AUTOMOTIVE TRANSMISSION

[75] Inventor: Tetsuya Iijima, Tokyo, Japan

[73] Assignee: Nissan Motor Company, Limited, Yokohama, Japan

[22] Filed: Feb. 7, 1974

[21] Appl. No.: 440,583

[30] Foreign Application Priority Data
Feb. 10, 1973 Japan................ 48-16114

[52] U.S. Cl. ............ 74/759; 74/753; 74/761; 74/763
[51] Int. Cl............................ F16h 57/10
[58] Field of Search ........... 74/753, 758, 759, 760, 74/761, 762, 763, 764, 765, 766, 767, 768, 769, 770

[56] References Cited
UNITED STATES PATENTS

| | | | |
|---|---|---|---|
| 3,701,293 | 10/1972 | Mori et al. | 74/759 |
| 3,736,815 | 6/1973 | Ito et al. | 74/759 |
| 3,811,343 | 5/1974 | Mori et al. | 74/759 |
| 3,812,739 | 5/1974 | Mori et al. | 74/763 |
| 3,815,445 | 6/1974 | Correll et al. | 74/764 X |
| 3,817,124 | 6/1974 | Mori et al. | 74/759 |
| 3,820,418 | 6/1974 | Ott | 74/763 X |
| 3,823,622 | 7/1974 | Mori et al. | 74/759 |

*Primary Examiner*—Samuel Scott
*Assistant Examiner*—Lance W. Chandler

[57] ABSTRACT

A planetary gear train comprises a combination of three planetary gear assemblies each having an externally toothed sun gear, an internally toothed ring gear, planet pinions rotatable between the sun and ring gears, and a pinion carrier connected to the planet pinions. The individual planetary gear assemblies are controlled to provide four forward and one reverse speed gear ratios through selective actuation of a first clutch associated with the ring gear of the first planetary gear assembly, a second clutch associated with the sun gears of the first and second planetary gear assemblies, a first brake also associated with the sun gears of the first and second planetary gear assemblies, a second brake associated with the ring gear of the second planetary gear assembly and either the sun gear or the pinion carrier of the third planetary gear assembly, and a third brake associated with either the pinion carrier or the ring gear of the third planetary gear assembly.

18 Claims, 11 Drawing Figures

PLANETARY AUTOMOTIVE TRANSMISSION

The present invention relates generally to automatic power transmission systems for automotive vehicles, and more particularly to epicyclic or "planetary" gear trains constituting automatic power transmission systems of the types using fluid couplings or torque converters. More particularly, the present invention is concerned with an automotive automatic power transmission system incorporating a combination of planetary gear assemblies which are arranged to provide four forward speeds and one reverse speed at the output shaft of the transmission system. The power transmission system herein disclosed is thus adapted for use especially in relatively light-duty automotive vehicles such as passenger cars.

A variety of automatically-operated four-forward-speed-and one-reverse speed power transmission systems have thus far been proposed for installation in automotive vehicles to provide a wide selection of gear ratios for the transmission systems. Since the gear ratios are based on the primary configuration of the planetary gear set, the intervals between the gear ratios are generally limited to basic values. Such restrictions become more serious where the design of individual gear elements is standardized based on the planetary gear assemblies constituting the transmission system to reduce production costs and simplify production techniques. A problem is therefore invited in that the gear ratios which are specified for automotive vehicles of one make or model are incompatible with vehicles of another make or model. The present invention contemplates solving this problem which is inherent in automotive power transmission systems using planetary gear trains.

It is accordingly an important object of the present invention to provide an automotive automatic power transmission system having an improved planetary gear train which is capable of providing a wide selection of gear ratios.

It is another important object of the invention to provide an automotive automatic power transmission system having an improved planetary gear train providing gear ratios which are compatible with power transmission systems of different makes and/or models of vehicles.

It is still another important object of the invention to provide an automotive automatic power transmission system featuring an ingenious combination of planetary gear assemblies each consisting of gear elements which can be standardized in basic configuration to not only individual gear assemblies but transmission systems of different makes and/or models of vehicles.

It is still another important object of the present invention to provide an improved automotive automatic power transmission having a planetary gear train which is simple, compact and light-weight.

It is still a further important object of the invention to provide an improved four-forward-speed-and-one-reverse-speed power transmission system which is suitable especially for installation in a relatively light-duty automotive vehicle such as a passenger car.

In accordance with the present invention, these and other objects are accomplished generally in an automotive power transmission system which comprises in combination a drive shaft, a driven shaft, first, second and third planetary gear assemblies each comprising an externally toothed sun gear rotatable about the driven shaft, an internally toothed ring gear concentrically rotatable around the sun gear about the driven shaft, at least one planet pinion rotatable about its axis and about the driven shaft and engaging with the sun gear and the ring gear and a carrier member connected to the planet pinion or pinions and rotatable therewith about the driven shaft, the sun gears of the first and second planetary gear assemblies being connected to and rotatable with each other through a first connecting member, the carrier members of the first and second planetary gear assemblies being connected to and rotatable with the driven shaft, the ring gear of the second planetary gear assembly being connected to and rotatable with one of the three members, viz., the sun gear, the ring gear and the carrier member of the third planetary gear assembly through a second connecting member, one of the remaining two of the three members being connected to and rotatable with the driven shaft, a first clutch connected between the drive shaft and the ring gear of the first planetary gear assembly, a second clutch connected between the drive shaft and the first connecting member, a first brake engageable with the first connecting member, a second brake engageable with the second connecting member and a third brake engageable with the other of the aforesaid remaining two of the three members of the third planetary gear assembly. The sun gear of the third planetary gear assembly may be connected either to the ring gear of the second planetary gear assembly through the second connecting member or to the driven shaft. Where the sun gear of the third planetary gear assembly is connected to the ring gear of the second planetary gear assembly, the ring gear and the carrier member of the third planetary gear assembly may be connected either to the third brake and the driven shaft, respectively, or conversely to the driven shaft and the third brake, respectively. In whichsoever instance, the second connecting member interconnects the ring gear of the second planetary gear assembly and the sun gear of the third planetary gear assembly so that the second brake is operable, when actuated, to make simultaneously stationary the ring gear of the second planetary gear assembly and the sun gear of the third planetary gear assembly. Where, on the other hand, the sun gear of the third planetary gear assembly is connected to the driven shaft, the ring gear and the carrier member of the third planetary gear assembly may be connected either to the third brake and the ring gear of the second planetary gear assembly, respectively, or conversely to the ring gear of the second planetary gear assembly and the third brake. The ring gear of the second planetary gear assembly in this instance is thus connected to either the ring gear or the carrier member of the third planetary gear assembly through the second connecting member so that the second brake is operable, when actuated, to make simultaneously stationary the ring gear of the second planetary gear assembly and either the ring gear or the carrier member of the third planetary gear assembly.

Each of the planetary gear assemblies which constitute the power transmission system according to the present invention may comprise at least one planet pinion which constantly meshes with the externally toothed sun gear and the internally toothed ring gear. A planetary gear assembly of such a nature will be herein referred to as a "simple" planetary gear assembly. When the carrier member connected to the planet pinion or pinions of a simple planetary gear assembly is held stationary, the sun gear and the ring gear of the gear assembly are rotated on the pinions in opposite directions about their common axis as will be readily understood from the particular gear arrangement. Otherwise, each of the planetary gear assemblies constituting the power transmission system according to the present invention may comprise at least one first planet pinion which is in constant mesh with the externally toothed sun gear of the planetary gear assembly and at least one second planet pinion which is meshed on one hand with the internally toothed ring gear of the planetary gear assembly. The first and second planet pinions are connected commonly to the carrier member of the planetary gear assembly and are thus rotatable together about the driven shaft, rolling about their respective axes on the sun gear and the ring gear, respectively. A planetary gear assembly of this particular nature will be herein referred to as a "complex" planetary gear assembly. As will also be understood from the specific gear arrangement of such a planetary gear assembly, the sun gear and the ring gear are rotated in the same direction about the driven shaft when the carrier member connected to the first and second planet pinions is held stationary.

Various gear ratios and accordingly speed reduction ratios will be achieved through selective actuation of the clutches and brakes which are incorporated in the power transmission system according to the present invention in the manner previously described. Four forward speeds and one reverse speed will thus be produced in the power transmission system through actuation of two of the clutches and brakes in accordance with predetermined pattern in which the first clutch and the third brake are actuated for the first-forward-speed gear ratio, the first clutch and the second brake are actuated for the second-forward-speed gear ratio, the first clutch and the first brake are actuated for the third-forward-speed gear ratio, the first and second clutches are actuated for the fourth-forward-speed gear ratio and the second clutch and the second brake are actuated for the reverse gear ratio.

Other features of an automotive power transmission system according to the present invention will become more apparent from the following description taken in conjunction with the accompanying drawings in which parts and elements having similar functions are designated by like reference numerals and characters throughout the figures and in which.

Description will now be made with reference to the drawings regarding the various embodiments of the power transmission system according to the present invention.

EMBODIMENT I

Figure 1:
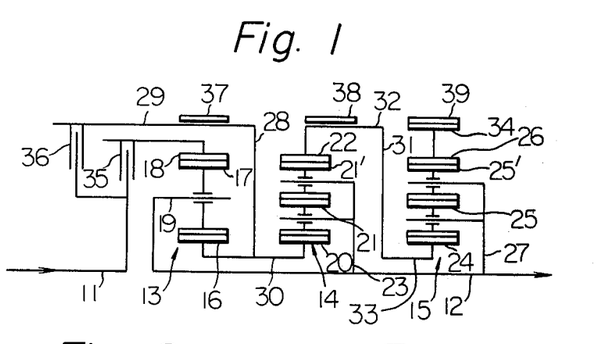
FIG. 1 is a schematic view of an upper half of a first preferred embodiment of a power transmission system according to the present invention.

Referring to FIG. 1 of the drawings, a first preferred embodiment of the power transmission system according to the present invention comprises a drive shaft 11 and driven shaft 12 which are in line with each other. The drive shaft 11 is a usual transmission main shaft which is connected to a driven member such as a turbine of a torque converter or a fluid coupling (not shown). The torque converter or the fluid coupling has a drive member or an impeller which is connected to a crankshaft of a power plant such as an internal combustion engine (not shown), as is customary in the art of automotive power transmission systems using torque converters or fluid couplings. The driven shaft 12 is a usual transmission output shaft providing driving connection between the transmission system and driving road wheels of the automotive vehicle.

Figure 2:
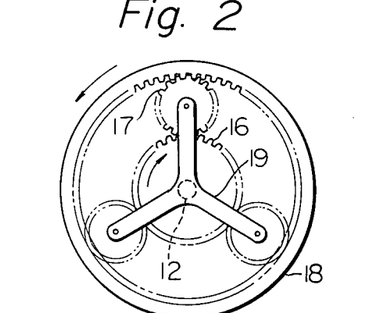
FIG. 2 is a front end view of a representative example of a simple planetary gear assembly incorporated in FIG. 1.
Figure 3:
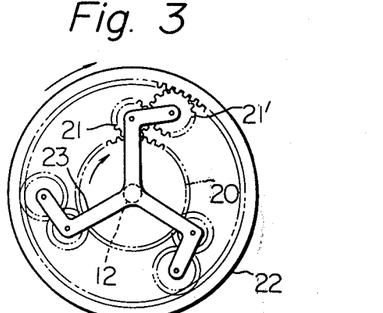
FIG. 3 is a front end view showing a representative example of a complex planetary gear assembly which is incorporated into the embodiment illustrated in FIG. 1.

The power transmission system as shown further comprises a planetary gear train which consists of a series combination of first, second and third planetary gear assemblies 13, 14 and 15, respectively. The first planetary gear assembly 13 is a simple planetary gear assembly as will be more clearly seen in FIG. 2, whereas each of the second and third planetary gear assemblies 14 and 15 is a complex planetary gear assembly as will be more clearly seen in FIG. 3, in which reference numerals and characters designate rotary elements constituting the second planetary gear assembly 14. Referring concurrently to FIGS. 1 and 2, the first planetary gear assembly of the simple type comprises an externally toothed sun gear 16 which is rotatable about the driven shaft 12, a plurality of planet pinions 17 which are in constant mesh with the sun gear 16 and which are rotatable about their respective axes and about the drive shaft 12, and an internally toothed ring gear 18 which is in constant mesh with the planet pinions 17 and which is rotatable concentrically around the sun gear 16 about the driven shaft 12. The planet pinions 17 are equiangularly spaced apart from each other about the driven shaft 12 as seen in FIG. 2 and have respective shafts which are connected through a common pinion carrier 19 of cage form to the driven shaft 12. Referring concurrently to FIGS. 1 and 3, the second planetary gear assembly 14 comprises an externally toothed sun gear 20 which is rotatable about the driven shaft 12, a plurality of first planet pinions 21 which are in constant mesh with the sun gear 20 and which are rotatable about their respective axes and about the driven shaft 12, a plurality of second planet pinions 21' which are respectively associated and in constant mesh with the first planet pinions 21 and which are rotatable about their respective axes and about the driven gear 12, and an internally toothed ring gear 22 which is in constant mesh with the second planet pinions 21' and which is rotatable concentrically about the sun gear 20 about the driven shaft 12. The first and second planet pinions 21 and 21' are equiangularly spaced around the driven shaft 12 and have respective shafts which are connected through a common pinion carrier 23 to the driven shaft 12. The third planetary gear assembly 15 is constructed essentially similar to the second planetary gear assembly 14 and accordingly comprises an externally toothed sun gear 24 rotatable about the driven shaft 12, a plurality of first planet pinions 25 in constant mesh with the sun gear 24 and rotatable about their respective axes and about the driven shaft 12, a plurality of second planet pinions 25' respectively associated and in constant mesh with the first planet pinions 25 and rotatable about their respective axes and about the driven shaft 12, and an internally toothed ring gear 26 which is in constant mesh with the second planet pinions 25' and which is rotatable concentrically around the sun gear 24 about the driven shaft 12. The first and second planet pinions 25 and 25' are equidistantly spaced apart from each other about the driven shaft 12 and have respective shafts which are connected through a common pinion carrier 27 to the driven shaft 12.

A first connecting member 28 has a drum portion 29 surrounding the first planetary gear assembly 13 and a hollow shaft portion 30 through which the sun gears 16 and 20 of the first and second planetary gear assemblies 13 and 14, respectively, are connected together and rotatable with each other about the driven shaft 12. A second connecting member 31 has a drum portion 32 surrounding the second planetary gear assembly 14 and a hollow shaft portion 33 surrounded by the third planetary gear assembly 15. The ring gear 22 of the second planetary gear assembly 14 and the sun gear 24 of the third planetary gear assembly 15 are connected together and rotatable with each other about the driven shaft 12 through the second connecting member 31. The ring gear 26 of the third planetary gear assembly 15 is connected to a drum 34 surrounding the third planetary gear assembly 15.

A first clutch 35 is interposed between the drive shaft 11 and the ring gear 18 of the first planetary gear assembly 13 so that the ring gear 18 is driven by the drive shaft 11 when the first clutch 35 is actuated to engage. A second clutch 36 is interposed between the drive shaft 11 and the drum portion 29 of the first connecting member 28 so that the sun gears 16 and 20 of the first and second planetary gear assemblies 13 and 14, respectively, are driven by the drive shaft 11 when the second clutch 36 is actuated to engage. A first brake 37 is engageable with the drum portion 29 of the first connecting member 28 so that the sun gears 16 and 20 of the first and second planetary gear assemblies 13 and 14, respectively, are held stationary or locked when the first brake 37 is actuated to lock the first connecting member 28. A second brake 38 is engageable with the drum portion 32 of the second connecting member 31 so that the ring gear 22 of the second planetary gear assembly 14 and the sun gear 24 of the third planetary gear assembly 15 are held stationary or locked when the second brake 38 is actuated to lock the second connecting member 31. A third brake 39 is engageable with the drum 34 surrounding the third planetary gear assembly 15 so that the ring gear 26 of the third planetary gear assembly 15 is held stationary or locked when the third brake 39 is actuated to lock the drum 34. The clutches 35 and 36 and the brakes 37, 38 and 39 are herein assumed to be and shown as multiple-disc clutches and band brakes, respectively. Such are, however, merely by way of example and thus not limitative of the scope of the technical concepts of a transmission system according to the present invention.

A power transmission system according to the present invention is intended to provide four forward speeds and one reverse speed as previously mentioned. The combination of the three planetary gear assemblies 13, 14 and 15 thus far described is thus adapted to be shifted between five different patterns for providing the four forward and one reverse speed depending upon the combinations of the clutches 35 and 36 and the brakes 37, 38 and 39. It is, in this instance, noted that the term "gear ratio" herein used means the ratio of the number of turns of the driven shaft 12 or a member rotating therewith to the number of turns of the drive shaft 11 or a member rotating therewith. The gear ratio as herein referred to is the reciprocal of a speed reduction ratio between the number of turns of the drive shaft 11 to the driven shaft 12.

The first and second clutches 35 and 36 and the first, second and third brakes 37, 38 and 38 of the embodiment of the power transmission system shown in FIG. 1 are actuated in accordance with patterns which are indicated in Table 1, in which the character "o" stands for an actuated or engaged condition of the clutch or brake and the character "x" for an unactuated condition of the clutch or brake. In Table 1 are further indicated examples of gear ratios and speed reduction ratios achieved through the specified combinations of the clutches and the brakes.

As is seen from Table 1, the first clutch 35 and the third brake 39 are actuated to produce the first forward speed gear ratio. The ring gear 18 of the first planetary gear assembly 13 is accordingly driven by the drive shaft 11 through the first clutch 35, and at the same time the ring gear 26 of the third planetary gear assembly 15 is held stationary with the drum 34 locked by the third brake 39. Under these conditions, the sun gear 16 of the first planetary gear assembly 13, the sun gear 20 and the ring gear 22 of the second planetary gear assembly 14 and the sun gear 24 of the third planetary gear assembly 15 are rotated in an opposite direction to the ring Table 1

| Speeds | Clutches | | Brakes | | | Speed reduction ratio | Gear ratio |
|---|---|---|---|---|---|---|---|
| | 35 | 36 | 37 | 38 | 39 | | |
| 1st-forward | o | x | x | x | o | 3.22 | 0.31 |
| 2nd-forward | o | x | x | o | x | 2.00 | 0.50 |
| 3rd-forward | o | x | o | x | x | 1.45 | 0.69 |
| 4th-forward | o | o | x | x | x | 1.00 | 1.00 |
| Reverse | x | o | x | x | o | 3.94 | 0.25 | gear 18 of the first planetary gear assembly 13, and the pinion carriers 19, 23 and 27 of the first, second and third planetary gear assemblies 13, 14 and 15, respectively are rotated in the same direction as the drive shaft 11. The first-forward-speed reduction ratio $f_1$ thus achieved is obtained from the equation:

$$f_1 = [a_1 + (a_2.a_3)]/a_2.a_3,$$

where $a_1$, $a_2$ and $a_3$ are the ratios of the numbers of teeth of the sun gears 16, 20 and 24 to the numbers of teeth of the ring gears 18, 22 and 26 of the first, second and third planetary gear assemblies 13, 14 and 15 respectively. The gear ratios and the speed reduction ratios indicated in Table 1 have been calculated on the assumption that all the values of $a_1$, $a_2$ and $a_3$ are 0.45.

To produce the second-forward-speed gear ratio, the first clutch 35 is engaged and the second brake 38 is actuated rather than the third brake 39 so that the ring gear 18 of the first planetary gear assembly 13 is driven by the drive shaft 11 through the first clutch 35 and the ring gear 22 of the second planetary gear assembly 14 and the sun gear 24 of the third planetary gear assembly 15 are held stationary with the second connecting member 31 locked by the second brake 38. Under these conditions, the sun gears 16 and 20 of the first and second planetary gear assemblies 13 and 14, respectively, are rotated in an opposite direction to the ring gear 18 of the first planetary gear assembly 13, whereas the ring gear 26 of the third planetary gear assembly 15 is rotated in the same direction as the ring gear 18 of the first planetary gear assembly 13. The pinion carriers 19 and 23 of the planetary gear assemblies 13 and 14, respectively, are thus concurrently rotated to rotate the driven shaft 12 in the same direction as the drive shaft 11. The second-forward-speed reduction ratio $f_2$ thus achieved is obtained from the equation:

$$f_2 = (a_2 + a_2)/a_2.$$

The third-forward-speed gear ratio is produced with the first clutch 35 engaged and the first brake 37 actuated rather than the second brake 38 so that the ring gear 18 of the first planetary gear assembly 13 is driven by the drive shaft 11 through the first clutch 35 and at the same time the sun gears 16 and 20 of the first and second planetary gear assemblies 19 and 23 are held stationary with the first connecting member 28 locked by the first brake 37. Under these conditions, the ring gear 22 of the second planetary gear assembly 14 and the ring gear 26 of the third planetary gear assembly 15 are rotated in the same direction as the ring gear 18 of the first planetary gear assembly 13, and the driven shaft 12 is rotated by the pinion carrier 19 of the first planetary gear assembly 13 in the same direction as the drive shaft 11. The third-forward-speed reduction ratio $f_3$ achieved in this manner is obtained from the equation:

$$f_3 = 1 + a_1.$$

The fourth-forward-speed gear ratio is produced when all the planetary gear assemblies are rotated together about the driven shaft 12 so that the rotation of the drive shaft 11 is transmitted directly to the driven shaft 12. For this purpose, both of the first and second clutches 35 and 36 are engaged and all the brakes 37, 38 and 39 released. The fourth-forward-speed reduction ratio $f_4$ is thus 1.

To achieve the reverse gear ratio, the second clutch 36 is engaged and the third brake 39 actuated so that the sun gears 16 and 20 of the first and second planetary gear assemblies 13 and 14, respectively, are driven by the drive shaft 11 through the second clutch 36, and the ring gear 26 of the third planetary gear assembly 15 is held stationary with the drum 34 locked by the third brake 39. The ring gear 22 of the second planetary gear assembly 14 and the sun gear 24 of the third planetary gear assembly 15 are rotated in the same direction as the sun gears 16 and 20 of the first and second planetary gear assemblies 13 and 14, respectively, whereas the ring gear 18 of the first planetary gear assembly 13 is rotated in an opposite direction to the sun gears 16 and 20 of the planetary gear assemblies 13 and 14. The pinion carriers 23 and 27 of the second and third planetary gear assemblies 14 and 15 respectively are rotated in an opposite direction to the sun gears 16 and 20 of the first and second planetary gear assemblies 13 and 14, respectively, to rotate the driven shaft 12 in an opposite direction to the drive shaft 11. The reverse gear ratio r achieved in this manner is obtained from the equation:

$$r = [1 - (a_2.a_3)]/a_1.a_3.$$

Figure 4:
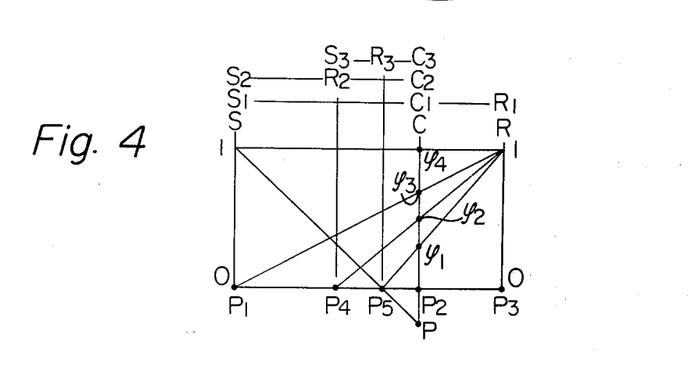
FIG. 4 is an alignment chart indicating speed reduction ratios achievable with the power transmission system shown in FIG. 1.

The gear ratios have been herein calculated by a mathematical approach alone but, if desired, the same may be obtained with the aid of an alignment chart as is familiar to those skilled in the art. FIG. 4 is an alignment chart which visually indicates the speed ratios achieved by the power transmission system shown in FIG. 1 when the clutches and brakes are actuated in accordance with the patterns shown in Table 1. The alignment chart has three spaced parallel vertical axes S, C and R which are perpendicular to a horizontal axis at points $P_1$, $P_2$ and $P_3$, respectively. The length $P_1P_3$ is divided by the point $P_2$ at a ratio of $1:a_1$, viz., at the ratio of the number of teeth of the ring gear 18 to the number of teeth of the sun gear 16 of the first planetary gear assembly 13. The vertical axes S, C and R are thus indicative of ratios $S_1$, $C_1$ and $R_1$ of speeds of rotation of the sun gear 16, the pinion carrier member 19 and the ring gear 18, respectively, of the first planetary gear assembly 13 to the speed of rotation of the drive shaft 11. Since the sun gear 16 of the first planetary gear assembly 13 is connected to the sun gear 20 of the second planetary gear assembly 14, the vertical axis S is also indicative of a ratio $S_2$ of the speed of rotation of the sun gear 20 of the second planetary gear assembly 14 to the speed of rotation of the drive shaft 11. Likewise, the vertical axis C indicates not only the speed ratio $C_1$, but ratios $C_2$ and $C_3$ of speeds of rotation of the pinion carriers 23 and 27 of the second and third planetary gear assemblies 14 and 15, respectively, to the speed of rotation of the drive shaft 11 because the pinion carriers 19, 23 and 27 are all connected together. The ratios $C_1$, $C_2$ and $C_3$ are equal to the ratio of the speed of rotation of the driven shaft 12 to the speed of rotation of the drive shaft 11. The length $P_1P_2$ on the horizontal axis is divided by a point $P_4$ at a ratio of $1-a_2: a_2$ wherein $a_2$ is the ratio of the number of teeth of the sun gear 20 to the number of teeth of the ring gear 22 of the second planetary gear assembly 14. If, thus, a vertical line is drawn perpendicular to the horizontal axis through this point $P_4$, the line will indicate ratios $R_2$ and $S_3$ of speeds of rotation of the ring gear 22 and the sun gear 24 of the second and third planetary gear assemblies 14 and 15, respectively, to the speed of rotation of the drive shaft 11. The length $P_4 P_2$ thus laid off is further divided by a point $P_5$ at a ratio of $1-a_3:a_3$ wherein $a_3$ is the ratio of the number of teeth of the sun gear 24 to the number of teeth of the ring gear 26 of the third planetary gear assembly 15. If a vertical line is drawn through this point $P_5$ perpendicular to the horizontal axis, a ratio $R_3$ of the speed of rotation of the ring gear 26 of the third planetary gear assembly 15 to the speed of rotation of the drive shaft 11 is produced. Any points on the vertical axes S, C and R above the horizontal axis indicate rotation in the same direction as the drive shaft 11, aand any point below the horizontal axis indicates rotation in an opposite direction to the drive shaft 11.

When the first clutch 35 is engaged and accordingly the ring gear 18 of the first planetary gear assembly 13 is driven by the drive shaft 11 through the first clutch 35, then the gear ratio $R_1$ equals 1. If, in this condition, the third brake 39 is actuated so that the ring gear 26 of the third planetary gear assembly 15 is held stationary by means of the third brake 39, the speed ratio $R_3$ is zero. If, thus, a line is drawn joining the point indicative of the speed ratio of 1 on the vertical axis R and the point $P_5$ indicative of the speed ratio of zero, a gear ratio for the first forward speed will be obtained on the vertical axis C intersected by the line. The first-forward-speed reduction ratio $f_1$ is the reciprocal of a gear ratio $\phi_1$ thus obtained, and can therefore be readily geometrically calculated from the proportional relations in the alignment chart. In a similar manner, the speed reduction ratios $f_2, f_3$ and $f_4$ can be readily obtained from points indicative of gear ratios $\phi_2$, $\phi_3$ and $\phi_4$ on the vertical axis C for the second, third and fourth forward speeds, respectively. When the sun gears 16 and 20 of the first and second planetary gear assemblies 13 and 14, respectively, are driven by the drive shaft 11 with the second clutch 36 engaged, then the speed ratios $S_1$ and $S_2$ become equal to 1. Since, in this condition, the ring gear 26 of the third planetary gear assembly 15 is held stationary with the third brake 39 actuated, the speed ratio $R_3$ is zero so that a point indicative of a gear ratio for the reverse speed will be obtained on the vertical axis C by a line drawn through the point indicative of 1 on the vertical axis S and the point $P_5$ indicative of the speed ratio $R_3$ on the horizontal axis. The speed reduction ratio r for the reverse speed can be readily calculated from the gear ratio $\rho$ obtained in this manner.

EMBODIMENT II

Figure 5:
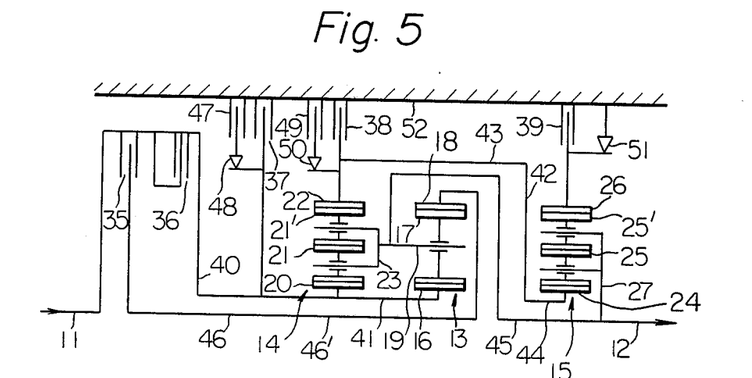
FIG. 5 is a schematic view of an upper half of a second preferred embodiment of a power transmission system according to the present invention.

A second preferred embodiment of a power transmission system according to the present invention as illustrated in FIG. 5 is essentially similar in construction to the first embodiment above described, thus comprising first, second and third planetary gear assemblies 13, 14 and 15. A major difference between the two embodiments is that while the first, second and third planetary gear assemblies 13, 14 and 15, respectively, are connected in series between the input and output of the transmission system in the second embodiment as in the first embodiment, the positions of the first and second planetary gear assemblies 13 and 14 of the second embodiment are reversed so that the first planetary gear assembly 13 is positioned between the second and third planetary gear assemblies 14 and 15.

The first planetary gear assembly 13 positioned between the second and third planetary gear assemblies 14 and 15 is of the simple type, comprising an externally toothed sun gear 16, planet pinions 17 in constant mesh with the sun gear 16, an internally toothed ring gear 18 in constant mesh with the planet pinions 17, and a pinion carrier 19 which connects the planet pinions 17 together. The second planetary gear assembly 14 positioned anterior to the first planetary gear assembly 13 is of the complex type, and comprises an externally toothed sun gear 20, first planet pinions 21 in constant mesh with the sun gear 20, second planet pinions 21' respectively associated with and in constant mesh with the first planet pinions 21, an internally toothed ring gear 22 in constant mesh with the second planet pinions 21', and a pinion carrier 23 which connects the first and second planet pinions 21 and 21' together. The third planetary gear assembly 15 positioned posterior of the first planetary gear assembly 13 is also of the complex type comprising an externally toothed sun gear 24, first planet pinions 25 in constant mesh with the sun gear 20, second planet pinions 25' respectively associated and constantly meshing with the first planet pinions 25, an internally toothed ring gear 26 in constant mesh with the second planet pinions 25', and a pinion carrier 27 connecting the first and second planet pinions 25 and 25' together.

A first connecting member 40 has a hollow shaft portion 41 which is concentrically surrounded by the first and second planetary gear assemblies 13 and 14. The sun gears 16 and 20 of the first and second planetary gear assemblies 13 and 14, respectively, are connected to and rotatable with each other about a common axis by this hollow shaft portion 41 of the first connecting member 40. A second connecting member 42 has a drum portion 43 surrounding the first planetary gear assembly 13 and a hollow shaft portion 44 surrounded by the third planetary gear assembly 15. The ring gear 22 of the second planetary gear assembly 14 and the sun gear 24 of the third planetary gear assembly 15 are connected to and coaxially rotatable with each other about a common axis by the second connecting member 42. A third connecting member 45 connects both of the pinion carriers 19 and 23 of the first and second planetary gear assemblies 13 and 14, respectively, to the driven shaft 12 across the first planetary gear assembly 13. The pinion carrier 27 of the third planetary gear assembly 15 is directly connected to the driven shaft 12.

The ring gear 18 of the first planetary gear assembly 13 or the sun gears 16 and 20 of the first and second planetary gear assemblies 13 and 14, respectively, are driven by the drive shaft 11 through selective actuation of a first clutch 35 and/or a second clutch 36, similar to the first embodiment. The first clutch 35 is connected at one side to the drive shaft 11 and at the other side to the ring gear 18 of the first planetary gear assembly 13 through a fourth connecting member 46 having a shaft portion 46' which is in line with the drive shaft 11 and the driven shaft 12 and which extends through the hollow shaft portion 41 of the first connecting member 40. The second clutch 36 is connected at one side to the drive shaft 11 and at the other side to the sun gears 16 and 20 of the first and second planetary gear assemblies 13 and 14, respectively, through the first connecting member 40.

Similar to the first embodiment shown in FIG. 1, the second embodiment further comprises first, second and third brakes 37, 38 and 39 which are illustrated as multi-disc brakes. The first brake 37 is engageable with the first connecting member 40 so that the sun gears 16 and 20 of the first and second planetary gear assemblies 13 and 14, respectively, are held stationary when the first brake 37 is actuated. In parallel with the first brake 37 is disposed a series combination of a multi-disc brake 47 and a one-way clutch 48. When engaged by the multi-disc brake 47, the one-way clutch 48 is operative to brake the first connecting member 40 in one direction so that the sun gears 16 and 20 of the first and second planetary gear assemblies 13 and 14, respectively, are prevented from being rotated in that direction. The second brake 38 is, on the other hand, engageable with the second connecting member 42 so that the ring gear 22 and the sun gear 24 of the second and third planetary gear assemblies 14 and 15 respectively are held stationary when the second brake 38 is actuated. Similar to the first brake 37, the second brake 38 is associated with a series combination of a multi-disc brake 49 and a one-way clutch 50. The one-way clutch 50 is adapted to brake the second connecting member 42 in one direction when engaged by the multi-disc brake 49 so that the ring gear 22 and the sun gear 24 of the second and third planetary gear assemblies 14 and 15, respectively, are held stationary. The third brake 39 is engageable with the ring gear 26 of the third planetary gear assembly 15 so that the ring gear 26 is held stationary when the third brake 39 is actuated. In parallel with the third brake 39 is disposed a oneway brake 51 which is adapted to allow the ring gear 26 to rotate only in the same direction as the drive shaft 11. The first, second and third brakes 37, 38 and 39, the multi-disc brakes 47 and 49 and the oneway brake 51 are fixed to a stationary transmission casing 52 within which the planetary gear assemblies 13, 14 and 15 are accommodated.

The first and second clutches 35 and 36 and the first, second and third brakes 37, 38 and 39 of the second embodiment above described are selectively actuated in accordance with the patterns which have been tabulated in Table 1. The second embodiment thus functions similar to the first embodiment, and the same gear ratios as indicated in Table 1 and readable from the alignment chart shown in FIG. 4 are achieved.

The additional braking arrangement including the series combinations of the multi-disc brake 47 and the one-way clutch 48 and the multi-disc brake 49 and the one-way clutch 50 and the one-way brake 51 is advantageous for alleviating shocks that occur in the transmission system when shifts are made during conditions in which the vehicle is being driven from the engine, viz., not moving by inertia as when coasting down a hill, the first or second connecting member 40 or 42 will be braked by means of the series combination of the multi-disc brake 47 and the one-way clutch 48 or of the multi-disc brake 49 and the one-way clutch 50 if the multi-disc brake 47 or 49 is brought into engagement with the associated one-way clutch 48 or 50, respectively, even though the first or second brake 37 or 38 is not actuated. The sun gears 16 and 20 of the first and second planetary gear assemblies 13 and 14, respectively, or the ring gear 22 and the sun gear 24 of the second and third planetary gear assemblies 14 and 15, respectively, can be locked without actuating the first or second brake 37 or 38 when the vehicle is being driven from the engine. Likewise, the ring gear 26 of the third planetary gear assembly 15 can be locked by means of the one-way brake 51 without the aid of the third brake 39 if the ring gear 26 is urged to rotate in the direction opposite to the direction of rotation of the drive shaft 11 when the vehicle is being driven from the engine. If, however, the vehicle is driving the engine as in the case of coasting down a hill, the one-way clutch 48 or 50 or the one-way brake 51 allows the associated rotary member or members (such as the sun gears 16 and 22, the ring gear 22 and the sun gear 24, or the ring gear 26) to rotate in the same direction as the drive shaft 11 unless the brake 37, 38 or 39 is actuated, resulting in inability of the engine to be braked by the inertia of the vehicle. When, thus, the vehicle is climbing up a hill, it is important that the brake 37, 38 or 39 be actuated in accordance with the pattern indicated in Table 1.

EMBODIMENT III

Figure 6:
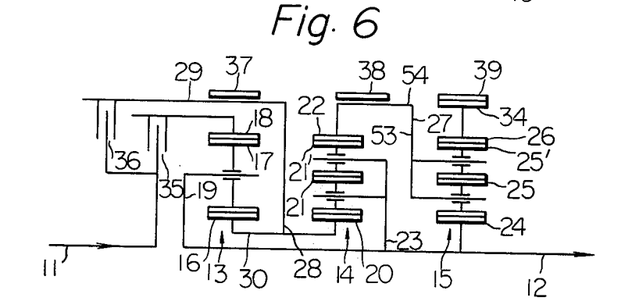
FIG. 6 is a schematic view showing an upper half of a third preferred embodiment of a power transmission system according to the present invention.

A third preferred embodiment of a power transmission system according to the present invention as shown in FIG. 6 also uses a first planetary gear assembly 13 of the simple type, and second and third planetary gear assemblies 14 and 15 of the complex type. The first, second and third planetary gear assemblies 13, 14 and 15 are arranged in series similar to the embodiment shown in FIG. 1.

The first planetary gear assembly 13 comprises an externally toothed sun gear 16, a set of planet pinions 17 which are in constant mesh with the sun gear 16, an internally toothed ring gear 18 which is in constant mesh with the planet pinions 17 and a pinion carrier 19 interconnecting the planet pinions 17. The second planetary gear assembly 14, on the other hand, comprises an externally toothed sun gear 20, first planet pinions 21 in constant mesh with the sun gear 20, second planet pinions 21' which are respectively associated with and in mesh with the first planet pinions 21, an internally toothed ring gear 22 in constant mesh with the second planet pinions 21' and a pinion carrier 23 connecting the first and second planet pinions 21 and 21' together. Likewise, the third planetary gear assembly 15 comprises an externally toothed sun gear 24, first planet pinions 25 in constant mesh with the sun gear 24, second planet pinions 25' which are respectively associated with and constantly mesh with the first planet pinions 25, an internally toothed ring gear 26 in constant mesh with the second planet pinions 25', and a pinion carrier 27 connecting the first and second planet pinions 25 and 25' together. The sun gears 16 and 20 of the first and second planetary gear assemblies 13 and 14 are connected to and rotatable with each other about the driven shaft 12 through a first connecting member 28 which has an outer drum portion 29 surrounding the first planetary gear assembly 13 and an inner hollow shaft portion 30 surrounded in part by the first planetary gear assembly 13 and in part by the second planetary gear assembly 14. The ring gear 22 of the second planetary gear assembly 14 is connected to and rotatable with the pinion carrier 27 of the third planetary gear assembly 15 through a second connecting member 53 having an outer drum portion 54. The pinion carriers 19 and 23 of the first and second planetary gear assemblies 13 and 14, respectively, and the sun gear 24 of the third planetary gear assembly 15 are connected to and rotatable with the driven shaft 12. The ring gear 26 of the third planetary gear assembly is connected to a drum 34.

A first clutch 35 is connected at one side to the drive shaft 11 and at the other side to the ring gear 18 of the first planetary gear assembly 13 so that the ring gear 18 is driven by the drive shaft 11 when the first clutch 35 is coupled. A second clutch 36 is connected at one side to the drive shaft 11 and at the other side to the drum portion 29 of the first connecting member 28 so that the sun gears 16 and 20 of the first and second planetary gear assemblies 13 and 14, respectively, are driven by the drive shaft 11 when the second clutch 36 is engaged.

A first brake 37 is engageable with the drum portion 29 of the first connecting member 28 so that the sun gears 16 and 20 of the first and second planetary gear assemblies 13 and 14, respectively, are held stationary when the first brake 37 is actuated. A second brake 38 is engageable with the drum portion 54 of the second connecting member 53 so that the pinion carrier 27 of the third planetary gear assembly 15 is held stationary when the second brake 38 is actuated. A third brake 39 is engageable with the drum 34 so that the ring gear 26 of the third planetary gear assembly 15 is held stationary when the third brake 39 is actuated.

The first and second clutches 35 and 36 and the first, second and third brakes 37, 38 and 39 are actuated in accordance with the pattern of Table 2, which also shows examples of gear ratios and speed reduction ratios achieved by scheduled actuation of the clutches and brakes. The gear ratios may be geometrically obtained from an alignment chart shown in FIG. 7, in which $P_2$ is a point which divides the length $P_1P_3$ of the horizontal axis at a ratio of $1:a_1$ wherein $a_1$ is the ratio of the number of teeth of the sun gear 16 to the number of teeth of the ring gear 18 of the first planetary gear assembly 13. The length $P_1P_2$ thus laid off is divided by point $P_4$ at a ratio of $1-a_2:a_2$, wherein $a_2$ is the ratio of the number of teeth of the sun gear 20 to the number of teeth of the ring gear 22 of the second planetary gear assembly 14. The length $P_4P_2$ thus laid off is divided by point $P_5$ at a ratio of $a_3:1-a_3$, wherein $a_3$ is the ratio of the number of teeth of the sun gear 24 to the number of teeth of the ring gear 26 of the third planetary gear assembly 15. The values of $a_1$, $a_2$ and $a_3$ are herein assumed as being 0.45 by way of example.

Table 2

| Speeds | Clutches | | Brakes | | | Speed reduction ratio | Gear ratio |
|---|---|---|---|---|---|---|---|
| | 35 | 36 | 37 | 38 | 39 | | |
| 1st-forward | o | x | x | x | o | 2.82 | 0.35 |
| 2nd-forward | o | x | x | o | x | 2.00 | 0.50 |
| 3rd-forward | o | x | o | x | x | 1.45 | 0.69 |
| 4th-forward | o | o | x | x | x | 1.00 | 1.00 |
| Reverse | x | o | x | x | o | 3.04 | 0.33 |

Figure 7:
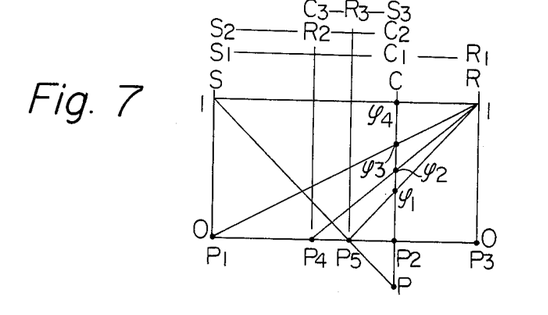
FIG. 7 is an alignment chart indicating speed reduction ratios achievable with the power transmission system illustrated in FIG. 6.

The first-forward-speed is thus produced when the first clutch 35 and the third brake 39 are actuated so that the ring gear 18 of the first planetary gear assembly 13 is driven by the drive shaft 11 through the first clutch 35, and the ring gear 26 of the third planetary gear assembly 15 is held stationary with the drum 34 locked by the third brake 39. Under these conditions, the sun gears 16 and 20 of the first and second planetary gear assemblies 13 and 14, respectively, the ring gear 22 of the second planetary gear assembly 14 and the pinion carrier 27 of the third planetary gear assembly 15 are rotated about the driven shaft 12 in the opposite direction to the drive shaft 11, as will be understood from the alignment chart of FIG. 7. The pinion carriers 19 and 23 of the first and second planetary gear assemblies 13 and 14, respectively, and the sun gear 24 of the third planetary gear assembly 15 are, on the other hand, rotated with the driven shaft 12 in the same direction as the drive shaft 11. The first-forward-speed reduction ratio $f_1$ thus achieved is determined from the following equation:

$$f_1 = \frac{a_1 + a_2(1-a_2)}{a_2(1-a_2)},$$

providing a gear ratio which is indicated at a point $\phi_1$ in the alignment chart of FIG. 7.

The second-forward-speed gear ratio is achieved when the first clutch 35 is engaged and at the same time the second brake 38 is actuated so that the ring gear 18 of the first planetary gear assembly 13 is driven by the drive shaft 11 through the first clutch 35, and simultaneously the pinion carrier 27 of the third planetary gear assembly 15 is held stationary with the drum portion 54 of the second connecting member 53 braked by the second brake 38. As will be understood from the alignment chart of FIG. 7, the sun gears 16 and 20 of the first and second planetary gear assemblies 13 and 14, respectively are rotated about the driven shaft 12 in the opposite direction to the drive shaft 11, while the ring gear 26 of the third planetary gear assembly 15 is rotated in the same direction as the drive shaft 11. The pinion carriers 19 and 23 of the first and second planetary gear assemblies 13 and 14, respectively, and the sun gear 24 of the third planetary gear assembly 15 are rotated in the same direction as the drive shaft 11 about and with the driven shaft 12. The second-forward-speed reduction ratio $f_2$ thus achieved is determined from the equation:

$$f_2 = (a_1 + a_2)/a_3,$$

and provides a gear ratio which is indicated at a point $\phi_2$ in the alignment chart of FIG. 7.

The third-forward-speed gear ratio is produced when the first clutch 35 is engaged, and at the same time the first brake 37 is actuated so that the ring gear 18 of the first planetary gear assembly 13 is driven by the drive shaft 11 through the first clutch 35, and simultaneously the sun gears 16 and 20 of the first and second planetary gear assemblies 13 and 14, respectively, are held stationary with the drum portion 29 of the first connecting member 28 braked by the first brake 37. Under these conditions, the ring gear 22 of the second planetary gear assembly 14 and the ring gear 26 and the pinion carrier 27 of the third planetary gear assembly 15 are rotated about the driven shaft 12 in the same direction as the drive shaft 11. The pinion carriers 19 and 23 of the first and second planetary gear assemblies 13 and 14, respectively, are also rotated in the same direction as the drive shaft 11 with the driven shaft 12. The third-forward-speed reduction ratio $f_3$ thus achieved is determined from the following equation:

$$f_3 = 1 + a_1,$$

providing a gear ratio which is indicated at a point $\phi_3$ in the alignment chart of FIG. 7.

The fourth-forward-speed gear ratio is produced when both the first and second clutches 35 and 36 are engaged, and at the same time all the brakes 37, 38 and 39 are de-actuated. Under these conditions, the first, second and third planetary gear assemblies 13, 14 and 15 are all rotated as a unit with the drive shaft 11 and the driven shaft 12 so that the driven shaft 12 is rotated in the same direction and at the same speed as the drive shaft 11. The fourth-forward-speed reduction ratio thus achieved is apparently 1, providing a gear ratio which is indicated at a point $\phi_4$ in the alignment chart of FIG. 7.

The reverse-speed gear ratio is produced when the second clutch 36 is engaged and at the same time the third brake 39 is actuated so that the sun gears 16 and 20 of the first and second planetary gear assemblies 13 and 14, respectively, are driven by the drive shaft 11 through the second clutch 36 and the ring gear 26 of the third planetary gear assembly 15 is held stationary with the drum 34 braked by the third brake 39. Under these conditions, the ring gear 22 of the second planetary gear assembly 14 and the pinion carrier 27 of the third planetary gear assembly 15 are rotated in the same direction as the drive shaft 11, but the pinion carriers 19 and 23 of the first and second planetary gear assemblies 13 and 14, respectively, and the sun gear 24 of the third planetary gear assembly 15 are rotated with the driven shaft 12 in the opposite direction to the drive shaft 11. The reverse-gear-speed reduction ratio $r$ thus produced is determined from the following equation:

$$r = \frac{1 - [a_2(1-a_3)]}{a_2(1-a_3)}.$$

and provides a gear ratio which is indicated at a point $\rho$ in the alignment chart of FIG. 7.

The third preferred embodiment above described is thus largely similar in construction and operation to the previously described first embodiment but is different therefrom in that in the third embodiment the ring gear 22 of the second planetary gear assembly 14 is connected to the pinion carrier 27 of the third planetary gear assembly 15 and the sun gear 24 of the third planetary gear assembly 15 is connected to the driven shaft 12. The clutches 35 and 36 of the second embodiment are shown in FIG. 6 as being of the multi-disc type, but are merely by way of example and accordingly may be replaced with clutches of another type. Likewise, the brakes 37, 38 and 39 which are shown as being of the band type may be replaced with multi-disc brakes where desired.

EMBODIMENT IV

Figure 8:
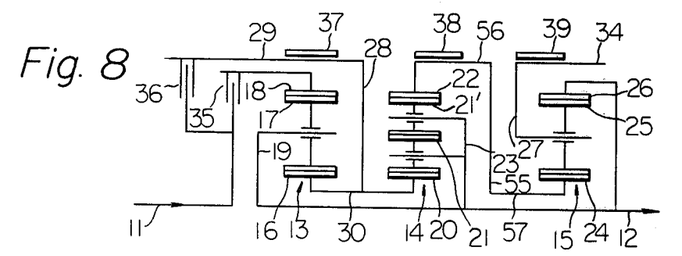
FIG. 8 is a schematic view which shows an upper half of a fourth preferred embodiment of a power transmission system according to the present invention.

The fourth preferred embodiment of a power transmission system according to the present invention as shown in FIG. 8 has a first planetary gear assembly 13 of the simple type, a second planetary gear assembly 14 of the complex type, and a third planetary gear assembly 15 of the simple type. The first, second and third planetary gear assemblies 13, 14 and 15 are disposed between an input and an output of the transmission system in this sequence.

The first planetary gear assembly 13 comprises an externally toothed sun gear 16, a set of planet pinions 17 in constant mesh with the sun gear 16, an internally toothed ring gear 18 in constant mesh with the planet pinions 17, and a pinion carrier 19 which connects the planet pinions 17 together. The second planetary gear assembly 14 comprises an externally toothed sun gear 20, a set of first planet pinions 21 in constant mesh with the sun gear 20, a set of second planet pinions 21' which are respectively associated and meshed with the first planet pinions 21, an internally toothed ring gear 22 which is in constant mesh with the second planet pinions 21', and a pinion carrier 23 which connects the first and second pinions 21 and 21' together. The third planetary gear assembly 15 is constructed similar to the first planetary gear assembly 13, comprising an externally toothed sun gear 24, a set of planet pinions 25 which are in constant mesh with the sun gear 24, an internally toothed ring gear 26 which is in constant mesh with the planet pinions 25, and a pinion carrier 27 which connectes the planet pinions together.

The sun gears 16 and 20 of the first and second planetary gear assemblies 13 and 14, respectively, are connected to and rotatable with each other about the driven shaft 12 through a first connecting member 28 which has an outer drum portion 29 surrounding the first planetary gear assembly 13 and an inner hollow shaft portion 30 which is surrounded in part by the first planetary gear assembly 13 and in part by the second planetary gear assembly 14. The ring gear 22 of the second planetary gear assembly 14 and the sun gear 24 of the third planetary gear assembly 15 are connected to and rotatable with each other about the driven shaft 12 by a second connecting member 55 which has an outer drum portion 56 surrounding the second planetary gear assembly 14 and an inner hollow shaft portion 57 which is surrounded by the third planetary gear assembly 15. The pinion carrier 27 of the third planetary gear assembly 15 is connected to a drum 34 surrounding the third planetary gear assembly 15. The pinion carriers 19 and 23 of the first and second planetary gear assemblies 13 and 14, respectively, are connected to and rotatable with the driven shaft 12.

A first clutch 35 is connected at one side with the drive shaft 11 and a the other side to the ring gear 18 of the first planetary gear assembly 13 so that the ring gear 18 is driven by the drive shaft 11 when the first clutch 35 is engaged. A second clutch 36 is connected at one side to the drive shaft 11 and at the other side to the first connecting member 28 so that the sun gears 16 and 20 of the first and second planetary gear assemblies 13 and 14, respectively, are driven by the drive shaft 11 when the second clutch 36 is engaged.

A first brake 37 is engageable with the drum portion 29 of the first connecting member 28 so that the sun gears 16 and 20 of the first and second planetary gear assemblies 13 and 14, respectively, are held stationary when the first brake 37 is actuated to lock the first connecting member 28. A second brake 38 is engageable with the drum portion 56 of the second connecting member 55 so that the ring gear 22 and the sun gear 24 of the second and third planetary gear assemblies 14 and 15, respectively, are held stationary when the second brake 38 is actuated to lock the second connecting member 55. A third brake 39 is engageable with the drum 34 so that the pinion carrier 27 of the third planetary gear assembly 15 is held stationary when the third brake 39 is actuated to lock the drum 34.

The first and second clutches 35 and 36 and the first, second and third brakes 37, 38 and 39 above described are actuated in accordance with a pattern shown in Table 3, which also shows examples of gear ratios and speed reduction ratios achieved through scheduled actuation of the clutches and brakes. The gear ratios may be geometrically determined from an alignment chart shown in FIG. 9, in which $P_2$ is a point by which a length $P_1P_3$ of the horizontal axis is divided at a ratio of $1:a_1$, wherein $a_1$ is the ratio of the number of teeth of the sun gear 16 to the number of teeth of the ring gear 18 of the first planetary gear assembly 13. The length $P_1P_2$ thus laid off is divided by point $P_4$ at a ratio of $a-a_2$. $:a_2$, wherein $a_2$ is the ratio of the number of teeth of the Table 3

Figure 9:
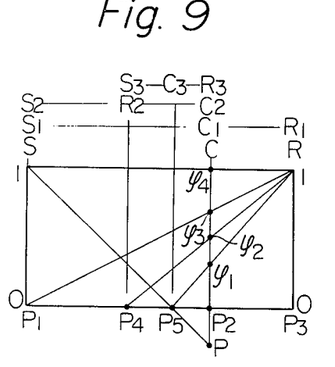
FIG. 9 is an alignment chart indicating speed reduction ratios achievable with the power transmission system illustrated in FIG. 8.

| Speeds | Clutches | | Brakes | | | Speed reduction ratio | Gear ratio |
|---|---|---|---|---|---|---|---|
| | 35 | 36 | 37 | 38 | 39 | | |
| 1st-forward | o | x | x | x | o | 3.82 | 0.26 |
| 2nd-forward | o | x | x | o | x | 2.00 | 0.50 |
| 3rd-forward | o | x | o | x | x | 1.45 | 0.69 |
| 4th-forward | o | o | x | x | x | 1.00 | 1.00 |
| Reverse | x | o | x | x | o | 5.26 | 0.19 | sun gear 20 to the number of teeth of the ring gear 22 of the second planetary gear assembly 14. The length $P_4P_5$ thus laid off is divided by point $P_5$ at a ratio of $1:a_3$, wherein $a_3$ is the ratio of the number of teeth of the sun gear 24 to the number of teeth of the ring gear 26 of the third planetary gear assembly 15. The values of $a_1$ and $a_2$ are assumed to be 0.45 whereas the value of $a_3$ is assumed to be 0.55.

The first-forward-speed gear ratio is thus produced when the first clutch 35 is engaged and at the same time the third brake 39 is actuated so that the ring gear 18 of the first planetary gear assembly 13 is driven by the drive shaft 11 through the first clutch 35 and simultaneously the pinion carrier 27 of the third planetary gear assembly 15 is held stationary with the drum 34 braked by the third brake 39. Under these conditions, the sun gear 16 of the first planetary gear assembly 13 and the sun gear 20 and the ring gear 22 of the second planetary gear assembly 14 are rotated about the driven shaft 12 in a direction opposite to the direction of rotation of the drive shaft 11. The pinion carriers 19 and 23 of the first and second planetary gear assemblies 13 and 14, respectively, and the ring gear 26 of the third planetary gear assembly 15 are, on the other hand, rotated with the driven shaft 12 in the same direction as the drive shaft 11. The first-forward-speed reduction ratio $f_1$ which is thus achieved is determined from the following equation:

$$f_1 = \frac{(a_1 + a_2)a_3 + a_1}{a_2 \cdot a_3}$$

and provides a gear ratio which is indicated at a point $\phi_1$ in the alignment chart of FIG. 9.

The second-forward-speed gear ratio is achieved when the first clutch 35 is engaged and at the same time the second brake 38 is actuated so that the ring gear 18 of the first planetary gear assembly 13 is driven by the drive shaft 11 through the first clutch 35 and similtaneously the ring gear 22 of the second planetary gear assembly 14 and the sun gear 24 of the third planetary gear assembly 15 are held stationary with the drum portion 56 of the second connecting member 55 braked by the second brake 38. The sun gears 16 and 20 of the first and second planetary gear assemblies 13 and 14, respectively, are consequently rotated about the driven shaft 12 in an opposite direction to the drive shaft 11 whereas the pinion carrier 27 of the third planetary gear assembly 15 is rotated about the driven shaft 12 in the same direction as the drive shaft 11, as will be readily understood from the alignment chart of FIG. 9. The pinion carriers 19 and 23 of the first and second planetary gear assemblies 13 and 14, respectively, and the ring gear 26 of the third planetary gear assembly 15 are rotated in the same direction as the drive shaft 11 with the driven shaft 12. The second-forward-speed reduction ratio $f_2$ which is thus achieved is determined from the equation:

$f_2 = (a_1 + a_2)/a_2$, thereby providing a gear ratio which is indicated by a point $\phi_2$ in the alignment chart of FIG. 9.

The third-forward-speed gear ratio is achieved when the first clutch 35 is engaged and at the same time the first brake 37 is actuated so that the ring gear 18 of the first planetary gear assembly 13 is driven by the drive shaft 11 through the first clutch 35 and simultaneously the sun gears 16 and 20 of the first and second planetary gear assemblies 13 and 14, respectively, are held stationary with the drum portion 29 of the first connecting member 28 braked by the first brake 37. Under these conditions, the ring gear 22 of the second planetary gear assembly 14 and the sun gear 24 and the pinion carrier 27 of the third planetary gear assembly 15 are rotated about the driven shaft 12 in the same direction as the drive shaft 11. The pinion carriers 19 and 23 of the first and second planetary gear assemblies 13 and 14, respectively, and the ring gear 26 are thus rotated with the driven shaft 12 in the same direction as the drive shaft 11. The third-forward-speed reduction ratio $f_3$ thus achieved is determined from the equation:

$$f_3 = 1 + a_1.$$

A corresponding gear ratio is indicated at a point 3 in the alignment chart illustrated in FIG. 9.

To produce the fourth-forward-speed gear ratio, both of the first and second clutches 35 and 36 are engaged with all the brakes 37, 38 and 39 de-actuated. Under these conditions, the first, second and third planetary gear assemblies 13, 14 and 15 are bodily rotated with the driven shaft 12 so that the speed reduction ratio $f_4$ and accordingly the gear ratio 4 are 1 as will be seen from the alignment chart of FIG. 9.

The reverse-speed gear ratio is achieved when the second clutch 36 is engaged and at the same time the third brake 39 is actuated so that the sun gears 16 and 20 of the first and second planetary gear assemblies 13 and 14, respectively, are rotated by the drive shaft 11 about the driven shaft 12 through the second clutch 36, and simultaneously the pinion carrier 27 of the third planetary gear assembly 15 is held stationary with the drum 34 braked by the third brake 39. Under these conditions, the ring gear 22 of the second planetary gear assembly 14 and the sun gear 24 of the third planetary gear assembly 15 are rotated about the driven shaft 12 in the same direction as the drive shaft 11 while the ring gear 18 of the first planetary gear assembly 13 is rotated in an opposite direction to the drive shaft 11. The pinion carriers 19 and 23 of the first and second planetary gear assemblies 13 and 14, respectively, and the ring gear 26 of the third planetary gear assembly 15 are rotated with the driven shaft 12 in an opposite direction to the drive shaft 11. The reverse-gear speed reduction ratio $r$ which is thus achieved is determined from the following equation:

$$r = \frac{(1-a_2)a_3 + 1}{a_2 \cdot a_3}.$$

A corresponding gear ratio is indicated at a point $p$ in the alignment chart of FIG. 9.

EMBODIMENT V

Figure 10:
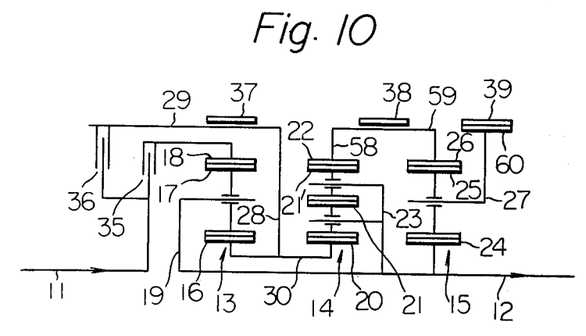
FIG. 10 is a schematic view showing an upper half of a fifth preferred embodiment of a power transmission system according to the present invention.

As illustrated in FIG. 10, the fifth preferred embodiment of a power transmission system according to the present invention is constructed essentially similar to the fourth embodiment of the invention above described. The embodiment shown in FIG. 10 thus comprises a first planetary gear assembly 13 of the simple type, a second planetary gear assembly 14 of the complex type and a third planetary gear assembly 15 of the simple type. These planetary gear assemblies 13, 14 and 15 are disposed in series between the input end and the output end of the transmission system in this sequence. The first planetary gear assembly 13 comprises an externally toothed sun gear 16, a set of planet pinions 17 which are in constant mesh with the sun gear 16, an internally toothed ring gear 18 which is constantly meshed with the planet pinions 17 and a pinion carrier 19 which connects the planet pinions 17 together. The second planetary gear assembly 14 comprises an externally toother sun gear 20, a set of first planet pinions 21 in constant mesh with the sun gear 20, a set of second planet pinions 21' respectively associated with and in constant mesh with the first planet pinions 21, an internally toothed ring gear 22 in constant mesh with the second planet pinions 21', and a pinion carrier 23 which connects the first and second planet pinions 21 and 21' together. The third planetary gear assembly 15 is constructed similar to the first planetary gear assembly 13, comprising an externally toothed sun gear 24, a set of planet pinions 25 which are in constant mesh with the sun gear 24, an internally toothed ring gear 26 which is in constant mesh with the planet pinions 25, and a pinion carrier 27 by which the planet pinions 25 are connected together. The sun gears 16 and 20 of the first and second planetary gear assemblies 13 and 14, respectively, are connected to and rotatable with each other about the driven shaft 12 through a first connecting member 28 which has an outer drum portion 29 surrounding the first planetary gear assembly 13 and an inner hollow shaft portion 30 which is surrounded in part by the first planetary gear assembly 13 and in part by the second planetary gear assembly 14. The ring gears 22 and 26 of the second and third planetary gear assemblies 14 and 15, respectively, are connected to and rotatable with each other about the driven shaft 12 by a second connecting member 58 having a drum portion 59 which surrounds in part the second planetary gear assembly 14 and in part the third planetary gear assembly 15. The pinion carrier 27 of the third planetary gear assembly 15 is connected to and rotatable with a drum 60. The pinion carriers 19 and 23 of the first and second planetary gear assemblies 13 and 14, respectively, and the sun gear 24 of the third planetary gear assembly 15 are connected to and rotatable with the driven shaft 12.

A first clutch 35 is connected at one side with the drive shaft 11 and at the other side with the ring gear 18 of the first planetary gear assembly 13. The ring gear 18 of the first planetary gear assembly 13 is thus driven by the drive shaft 11 to rotate about the driven shaft 12 when the first clutch 35 is engaged. A second clutch 36 is connected at one side to the drive shaft 11 and at the other side to the sun gears 16 and 20 of the first and second planetary gear assemblies 13 and 14, respectively, through the first connecting member 28. The sun gears 16 and 20 of the first and second planetary gear assemblies 13 and 14, respectively, are thus driven by the drive shaft 11 to rotate about the driven shaft 12 when the second clutch 36 is engaged. A first brake 37 is engageable with the drum portion 29 of the first connecting member 28 so that the sun gears 16 and 20 of the first and second planetary gear assemblies 13 and 14 are held stationary when the first brake 37 is actuated. A second brake 38 is engageable with the drum portion 59 of the second connecting member 58 so that the ring gears 22 and 26 of the second and third planetary gear assemblies 14 and 15, respectively, are held stationary when the second brake 38 is actuated. A third brake 39 is engageable with the drum 60 so that the pinion carrier 27 of the third planetary gear assembly 15 is held stationary when the third brake 39 is actuated.

The first and second clutches 35 and 36 and the first, second and third brakes 37, 38 and 39 are actuated to provide four-forward-speed and onereverse-speed reduction ratios in accordance with a pattern shown in Table 4, which also shows examples of gear ratios and speed change ratios which are achieved through scheduled actuation of the clutches and brakes. The speed ratios and accordingly the gear ratios may be geometrically obtained from an alignment chart illustrated in FIG. 11, in which a point $P_2$ divides a length $P_1P_3$ of the horizontal axis at a ratio of $1:a_1$, wherein $a_1$ is the ratio of the number of teeth of the sun gear 16 to the number of teeth of the ring gear 18 of the first planetary gear assembly 13. The length $P_1P_2$ thus laid off is divided by a point $P_4$ at a ratio of $1-a_2:a_2$, wherein $a_2$ is the ratio of the number of teeth of the sun gear 20 to the number of teeth of the ring gear 22 of the second planetary gear assembly 14. The length $P_4P_2$ thus laid off is divided by a point $P_5$ at a ratio of $a_3:1-a_3$, wherein $a_3$ is the ratio of the number of teeth of the sun gear 24 to the number of teeth of the ring gear 26. The gear ratios and speed reduction ratios indicated in Table 4 are calculated on the assumption that the values of $a_1$ and $a_2$ are 0.45 and the value of $a_3$ is 0.55.

The first-forward-speed gear ratio is thus

Table 4

| Speeds | Clutches | | Brakes | | | Speed reduction ratio | Gear ratio |
|---|---|---|---|---|---|---|---|
| | 35 | 36 | 37 | 38 | 39 | | |
| 1st-forward | o | x | x | x | o | 2.55 | 0.39 |
| 2nd-forward | o | x | x | o | x | 2.00 | 0.50 |
| 3rd-forward | o | x | o | x | x | 1.45 | 0.69 |
| 4th-forward | o | o | x | x | x | 1.00 | 1.00 |
| Reverse | x | o | x | x | o | 2.44 | 0.41 | produced when the first clutch 35 is engaged and at the same time the third brake 39 is actuated so that the ring gear 18 of the first planetary gear assembly 13 is driven by the drive shaft 11 through the first clutch 35, and simultaneously the pinion carrier 27 of the third planetary gear assembly 15 is held stationary with the drum 60 braked by the third brake 39. Under these conditions, the sun gear 16 of the first planetary gear assembly 13, the sun gear 20 and the ring gear 22 of the second planetary gear assembly 14 and the ring gear 26 of the third planetary gear assembly 15 are rotated about the driven shaft 12 in an opposite direction to the drive shaft 11. At the same time, the pinion carriers 19 and 23 of the first and second planetary gear assemblies 13 and 14, respectively, and the sun gear 26 of the third planetary gear assembly 15 are rotated with the driven shaft 12 in the same direction as the drive shaft 11. The speed reduction ratio $f_1$ which is thus achieved is determined from the equation:

$$f_1 = (a_1 + a_2 + a_1.a_3)/a_2.$$

Figure 11:
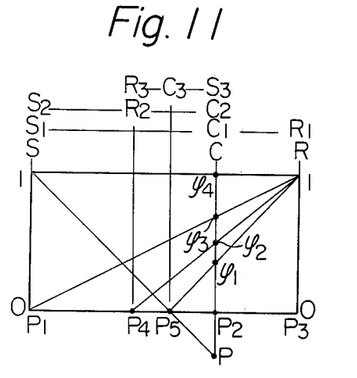
FIG. 11 is an alignment chart indicating speed reduction ratios achievable with the power transmission system illustrated in FIG. 10.

A corresponding gear ratio is indicated at a point $\phi_1$ in the alignment chart of FIG. 11.

The second-forward-speed gear ratio is achieved when the first clutch 35 is engaged and at the same time the second brake 38 is actuated so that the ring gear 18 of the first planetary gear assembly 13 is driven by the drive shaft 11 through the first clutch 35, and simultaneously the ring gears 22 and 26 of the second and third planetary gear assemblies 14 and 15, respectively, are held stationary with the drum portion 59 of the second connecting member 58 braked by the second brake 38. Under these conditions, the sun gears 16 and 20 of the first and second planetary gear assemblies 13 and 14, respectively, are rotated about the driven shaft 12 in an opposite direction to the drive shaft 11, whereas the pinion carrier 27 of the third planetary gear assembly 15 is rotated about the driven shaft 12 in the same direction as the drive shaft 11. The driven shaft 12 is driven by the pinion carrier 19 and 23 of the first and second planetary gear assemblies 13 and 14, respectively, and the sun gear 24 of the third planetary gear assembly 15, with the second-forward-speed reduction ratio $f_2$ being determined from the following equation:

$$f_2 = (a_1 + a_2)/a_2.$$

A corresponding gear ratio is indicated at a point $\phi_2$ in the alignment chart of FIG. 11.

The third-forward-speed gear ratio is produced when the first clutch 35 is engaged and at the same time the first brake 37 is actuated so that the ring gear 18 of the first planetary gear assembly 13 is driven by the drive shaft 11 through the first clutch 35 and simultaneously the sun gears 16 and 20 of the first and second planetary gear assemblies 13 and 14, respectively, are held stationary with the drum portin 29 of the first connecting member 28 braked by the first brake 37. Under these conditions, the ring gear 22 of the second planetary gear assembly 14 and the ring gear 26 and the pinion carrier 27 of the third planetary gear assembly 15 are rotated about the driven shaft 12 in the same direction as the drive shaft 11, whereas the pinion carriers 19 and 23 of the first and second planetary gear assemblies 13 and 14, respectively, and the sun gear 24 of the third planetary gear assembly 15 are also rotated in the same direction as the drive shaft 11 with the driven shaft 12. The driven shaft 12 is thus driven by the pinion carrier 19 of the first planetary gear assembly 13 at the third-forward-speed reduction ratio $f_3$ which is given by:

$$f_3 = 1 + a_1,$$

providing a gear ratio which is indicated at a point $\phi_3$ in the alignment chart of FIG. 11.

The fourth-forward-speed gear ratio is achieved when both of the first and second clutches 35 and 36 are engaged with all the brakes 37, 38 and 39 deactuated. Under these conditions, all the planetary gear assemblies 13, 14 and 15 are bodily rotated with the driven shaft 12 to provide direct driving connection from the drive shaft 11 to the driven shaft 12. The fourth-forward-speed reduction ratio $f_4$ and accordingly the resultant gear ratio $\phi_4$ are 1.

The reverse-speed gear ratio $r$ is achieved when the second clutch 36 is coupled and at the same time the third brake 38 is actuated so that the sun gears 16 and 20 of the first and second planetary gear assemblies 13 and 14, respectively, are driven by the drive shaft 11 through the second clutch 36 and simultaneously the pinion carrier 27 of the third planetary gear assembly 15 is held stationary with the drum 60 braked by the third brake 39. Under these conditions, the ring gears 22 and 26 of the second and third planetary gear assemblies 14 and 15, respectively, are rotated about the driven shaft 12 in the same direction as the drive shaft 11, whereas the pinion carriers 19 and 23 of the first and second planetary gear assemblies 13 and 14, respectively, and the sun gear 24 of the third planetary gear assembly 15 are rotated with the driven shaft 12 in an opposite direction to the drive shaft 11. The driven shaft 12 is thus driven by the pinion carrier 23 of the second planetary gear assembly 14 and the sun gear 24 of the third planetary gear assembly 15 at the reverse-speed reduction ratio $r$ which is determined from the following equation:

$$r = (1 - a_2 + a_3)/a_2.$$

A corresponding gear ratio is indicated at a point $\rho$ in the alignment chart of FIG. 11.

From the foregoing description it will have been appreciated that a planetary gear arrangement incorporated into the automotive power transmission system according to the present invention is capable of providing a wide variety of selection of gear ratios using a minimum number of component elements which can be standardized, not only of the planetary gear assemblies of a single transmission system but of power transmissions for use in automotive vehicles of various types and models. During forward drive conditions, in particular, the driving torque from the drive shaft is imparted to the planetary gear arrangement through the ring gear which is larger in diameter than the sun gear and the pinion carrier, and for this reason, the individual gear elements of the planetary gear arrangement are subject to lesser load. This will permit significant reduction of the overall dimensions, especially the diameters, of the individual planetary gear assemblies and accordingly of the transmission system as a whole. Since, moreover, the torque which is transmitted by the clutches is not greater than the torque delivered from the drive shaft, the clutches may also be relatively small-sized. Also, no excessive load will be exerted on the individual gear elements so that the transmission system may have a compact and light-weight construction. The first clutch is engaged during forward drive conditions so that any forward-speed gear ratio can be achieved simply by actuating one of the brakes. This will provide utmost ease of controlling the shifting operations of the transmission system during forward drive conditions.

The present invention is thus expected to contribute to reducing the production cost and simplifying the production techniques of automotive power transmission systems using planetary gear trains to produce four forward and one reverse speeds.

What is claimed is:

1. An automotive power transmission system for providing four forward and one reverse speed, comprising, in combination, a drive shaft, a driven shaft, first, second and third planetary gear assemblies each comprising an externally toothed sun gear rotatable about an axis in line with said driven shaft, an internally toothed ring gear rotatable about said axis, at least one planet pinion rotatable about its own axis and about said axis in line with the driven shaft and engaging on one hand with said sun gear and on the other hand with said ring gear and a pinion carrier connected to said at least one planet pinion and rotatable therewith about said axis in line with the driven shaft, the sun gears of the first and second planetary gear assemblies being connected to and rotatable with each other through a first connecting member, the pinion carriers of the first and second planetary gear assemblies being connected to and rotatable with the driven shaft, the ring gear of the second planetary gear assembly being connected to and rotatable with one of the three members, viz., the sun gear, the ring gear and the pinion carrier of the third planetary gear assembly through a second connecting member, one of the remaining two of said three members being connected to and rotatable with the driven shaft, a first clutch connected between the drive shaft and the ring gear of the first planetary gear assembly, a second clutch connected between the drive shaft and said first connecting member, a first brake engageable with said first connecting member, a second brake engageable with said second connecting member and a third brake engageable with the other of said remaining two of said three members of the third planetary gear assembly.

2. An automotive power transmission system as claimed in claim 1, in which the sun gear of the third planetary gear assembly is connected to and rotatable with the ring gear of the second planetary gear assembly so that one of the ring gear and the pinion carrier of the third planetary gear assembly is connected to the driven shaft through said second connecting member and the other thereof is connected to said third brake.

3. An automotive power transmission system as claimed in claim 2, in which the ring gear and the pinion carrier of the third planetary gear assembly are respectively connected to the third brake and the driven shaft.

4. An automotive power transmission system as claimed in claim 3, in which the sun gear and the ring gear of the first planetary gear assembly are rotatable in mutually opposite directions when the associated pinion carrier is locked and in which the sun gear and the ring gear of each of the second and third planetary gear assemblies are rotatable in the same direction when the associated pinion carrier is locked.

5. An automotive power transmission system as claimed in claim 4, in which said first clutch is engaged to cause the ring gear of the first planetary gear assembly to be driven by the drive shaft for achieving any one of the first to fourth forward speed gear ratios, said second clutch is engaged to cause the sun gears of the first and second planetary gear assemblies to be driven by the drive shaft for achieving the fourth forward speed or reverse speed gear ratio, said first brake is actuated to hold stationary the sun gears of the first and second planetary gear assemblies for achieving the third forward speed gear ratio, said second brake is actuated to hold stationary the ring gear and the sun gear of the second and third planetary gear assemblies, respectively, for achieving the second forward speed gear ratio, and said third brake is actuated to hold stationary the ring gear of the third planetary gear assembly for achieving the first forward speed gear ratio.

6. An automotive power transmission system as claimed in claim 4, in which said first, second and third planetary gear assemblies are disposed in series between the input end and the output end of the power transmission system in this sequence.

7. An automotive power transmission system as claimed in claim 4, in which said second, first and third planetary gear assemblies are disposed in series between the input end and the output end of the power transmission system in this sequence.

8. An automotive power transmission system as claimed in claim 2, in which the ring gear and the pinion carrier of the third planetary gear assembly are connected respectively to the driven shaft and the third brake.

9. An automotive power transmission system as claimed in claim 8, in which the sun gear and the ring gear of each of said first and second planetary gear assemblies are rotatable in mutually opposite directions when the associated pinion carrier is locked, and in whcih the sun gear and the ring gear of said second planetary gear assembly are rotatable in the same direction when the associated pinion carrier is locked.

10. An automotive power transmission system as claimed in claim 9, in which said first clutch is engaged to cause the ring gear of the first planetary gear assembly to be driven by the drive shaft for achieving any one of the first to fourth forward speed gear ratios, said second clutch is engaged to cause the sun gears of the first and second planetary gear assemblies to be driven by the drive shaft for achieving the fourth-forward or reverse-speed gear ratio, said first brake is actuated to lock the sun gears of the first and second planetary gear assemblies for achieving the third forward speed gear ratio, said second brake is actuated to hold stationary the ring gear and the sun gear of the second and third planetary gear assemblies, respectively, for achieving the second forward speed gear ratio, and said third brake is actuated to hold the pinion carrier of the third planetary gear assembly for achieving the first forward speed gear ratio.

11. An automotive power transmission system as claimed in claim 1, in which the sun gear of the third planetary gear assembly is connected to the driven shaft so that one of the ring gear and the pinion carrier of the third planetary gear assembly is connected to the ring gear of the second planetary gear assembly through said second connecting member and the other thereof is connected to said third brake.

12. An automotive power transmission system as claimed in claim 11, in which the ring gear and the pinion carrier of the third planetary gear assembly are connected respectively to the third brake and the ring gear of the second planetary gear assembly.

13. An automotive power transmission system as claimed in claim 12, in which the sun gear and the ring gear of the first planetary gear assembly are rotatable in mutually opposite directions when the associated pinion carrier is locked, and in which the sun gear and the ring gear of each of the second and third planetary gear assemblies are rotatable in the same direction when the associated pinion carrier is locked.

14. An automotive power transmission system as claimed in claim 13, in which said first clutch is engaged to cause the ring gear of the first planetary gear assembly to be driven by the drive shaft for achieving any one of the first to fourth forward speed gear ratios, said second clutch is engaged to cause the sun gears of the first and second planetary gear assemblies to be driven by the drive shaft for achieving the fourth forward-speed or reverse speed gear ratios, said first brake is actuated to lock the sun gears of the first and second planetary gear assemblies for achieving the third forward speed gear ratio, said second brake is actuated to lock the ring gear and the pinion carrier of the second and third planetary gear assemblies, respectively, for achieving the second forward speed gear ratio, and said third brake is actuated to lock the ring gear of the third planetary gear assembly for achieving the first forward speed gear ratio.

15. An automotive power transmission system as claimed in claim 11, in which the ring gear and the pinion carrier of the third planetary gear assembly are respectively connected to the ring gear of the second planetary gear assembly and the third brake.

16. An automotive power transmission system as claimed in claim 15, in which the sun gear and the ring gear of each of the first and third planetary gear assemblies are rotatable in mutually opposite directions when the associated pinion carrier is locked, and in which the sun gear and the ring gear of the second planetary gear assembly are rotatable in the same direction when the associated pinion carrier is locked.

17. An automotive power transmission system as claimed in claim 16, in which said first clutch is engaged to cause the ring gear of the first planetary gear assembly to be driven by the drive shaft for achieving any one of the first to fourth forward speed gear ratios, said second clutch is engaged to cause the sun gears of the first and second planetary gear assemblies to be driven by the drive shaft for achieving the fourth forward or reverse speed gear ratio, said first brake is actuated to hold stationary the sun gears of the first and second planetary gear assemblies for achieving the third forward speed gear ratio, said second brake is actuated to hold stationary the ring gears of the second and third planetary gear assemblies for achieving the second forward speed gear ratio, and said third brake is actuated to hold stationary the pinion carrier of the third planetary gear assembly for achieving the first forward speed gear ratio.

18. An automotive power transmission system as claimed in claim 1, further comprising a first series combination of a brake and a one-way clutch disposed in parallel to said first brake, a second series combination of a brake and a one-way clutch disposed in parallel to said second brake and a one-way brake disposed in parallel to said third brake.

* * * * *